United States Patent
Piedras et al.

(10) Patent No.: US 12,445,788 B2
(45) Date of Patent: Oct. 14, 2025

(54) POWER MANAGEMENT IN LOW POWER WIRELESS LINK IN A HEARING AID SYSTEM

(71) Applicant: Oticon A/S, Smørum (DK)

(72) Inventors: Alberto Escolar Piedras, Smørum (DK); Peter Søren Kirk Hansen, Smørum (DK)

(73) Assignee: Oticon A/S, Smørum (DK)

( * ) Notice: Subject to any disclaimer, the term of this patent is extended or adjusted under 35 U.S.C. 154(b) by 0 days.

(21) Appl. No.: 18/651,174

(22) Filed: Apr. 30, 2024

(65) Prior Publication Data

US 2024/0284130 A1    Aug. 22, 2024

Related U.S. Application Data

(63) Continuation of application No. 17/509,971, filed on Oct. 25, 2021, now Pat. No. 12,003,923, which is a
(Continued)

(30) Foreign Application Priority Data

Sep. 7, 2017  (EP) ..................................... 17189743

(51) Int. Cl.
 H04R 25/00    (2006.01)
 H04W 52/14   (2009.01)
 (Continued)

(52) U.S. Cl.
 CPC ........ H04R 25/554 (2013.01); H04W 52/241 (2013.01); H04W 52/283 (2013.01);
 (Continued)

(58) Field of Classification Search
 CPC ................ H04R 25/554; H04R 25/552; H04R 2225/025; H04R 2225/31; H04R 2225/33;
 (Continued)

(56) References Cited

U.S. PATENT DOCUMENTS

| 5,008,635 A | 4/1991 | Hanke et al. |
| 2008/0226107 A1 | 9/2008 | Boguslavskij et al. |

(Continued)

FOREIGN PATENT DOCUMENTS

| EP | 0 675 609 A2 | 10/1995 |
| EP | 2 211 579 B1 | 7/2012 |

OTHER PUBLICATIONS

Qin et al., "Link Quality Estimation for Future Cooperating Objects", The Second International Workshop on Wireless Networks and Multimedia, WNM 2011, Jan. 1, 2011, total of 4 pages.
(Continued)

*Primary Examiner* — Qin Zhu
(74) *Attorney, Agent, or Firm* — Birch, Stewart, Kolasch & Birch, LLP

(57) ABSTRACT

A hearing aid system is configured for managing the power of a wireless link. The hearing aid system includes a first hearing aid device and a mobile device, each of the devices including a transmit and receive unit for establishing a short range wireless link between the devices. At least one of the devices includes: a microphone configured to receive an acoustical audio signal; a signal processor configured to process an audio signal based on the acoustical audio signal; and first link quality estimating circuitry configured to determine rate of change of a link quality signal. The at least one of the devices is configured to transmit the link quality signal to the other device, and the other device is configured to determine a power level of transmission of an information packet based on the rate of change of the link quality signal via a power controller comprised by the other device.

14 Claims, 6 Drawing Sheets

Related U.S. Application Data continuation of application No. 16/840,927, filed on Apr. 6, 2020, now Pat. No. 11,197,108, which is a continuation of application No. 16/124,073, filed on Sep. 6, 2018, now Pat. No. 10,652,675.

(51) Int. Cl.
*H04W 52/24* (2009.01)
*H04W 52/28* (2009.01)
*H04W 52/36* (2009.01)
*H04W 52/52* (2009.01)

(52) U.S. Cl.
CPC ............ *H04W 52/52* (2013.01); *H04R 25/552* (2013.01); *H04R 2225/025* (2013.01); *H04R 2225/31* (2013.01); *H04R 2225/33* (2013.01); *H04R 2225/55* (2013.01); *H04R 2225/61* (2013.01); *H04R 2420/07* (2013.01); *H04R 2460/03* (2013.01); *H04W 52/146* (2013.01); *H04W 52/245* (2013.01); *H04W 52/367* (2013.01)

(58) Field of Classification Search
CPC ............ H04R 2225/55; H04R 2225/61; H04R 2420/07; H04R 2460/03; H04W 52/241; H04W 52/283; H04W 52/52; H04W 52/146; H04W 52/245; H04W 52/367
See application file for complete search history.

(56) References Cited

U.S. PATENT DOCUMENTS

| | | |
|---|---|---|
| 2010/0054512 A1 | 3/2010 | Solum |
| 2010/0184383 A1 | 7/2010 | Lerke |
| 2013/0108058 A1 | 5/2013 | Launer et al. |
| 2014/0185845 A1* | 7/2014 | Udesen ................ H04R 25/554 381/313 |
| 2015/0048976 A1 | 2/2015 | Petersen et al. |
| 2015/0124976 A1* | 5/2015 | Pedersen .............. H04R 25/552 381/23.1 |
| 2015/0163602 A1* | 6/2015 | Pedersen .............. H04R 25/554 381/315 |
| 2017/0171046 A1 | 6/2017 | Flood et al. |
| 2017/0311092 A1* | 10/2017 | Secall ..................... G10L 25/60 |

OTHER PUBLICATIONS

Vlavianos et al., "Assessing Link Quality in IEEE 802.11 Wireless Networks: Which is the Right Metric?", 2008 IEEE, Sep. 15, 2008, total of 6 pages.

* cited by examiner

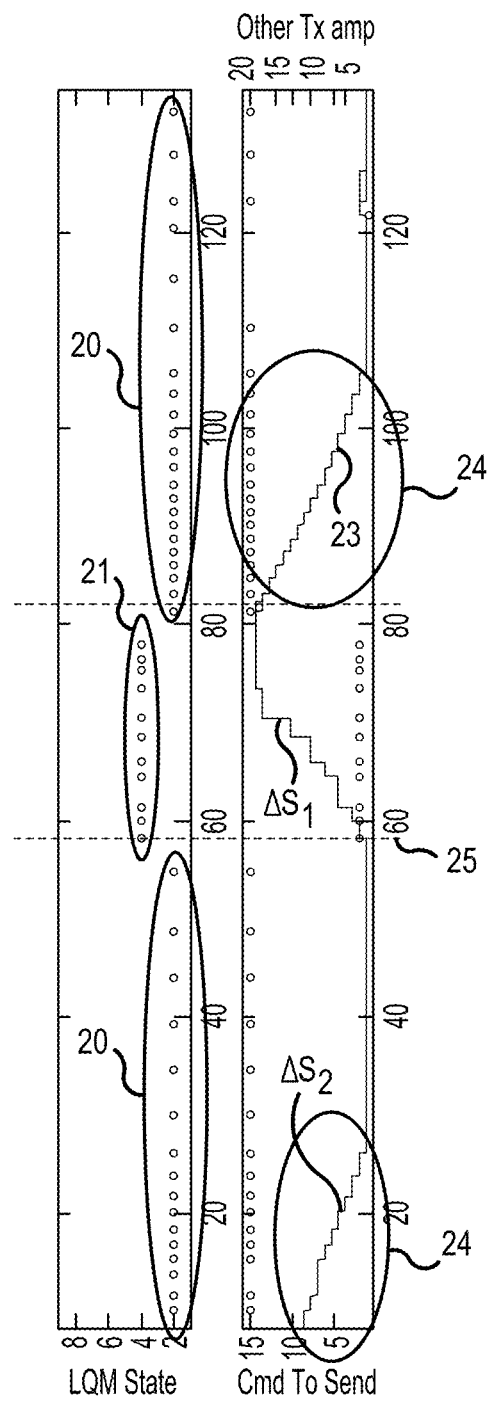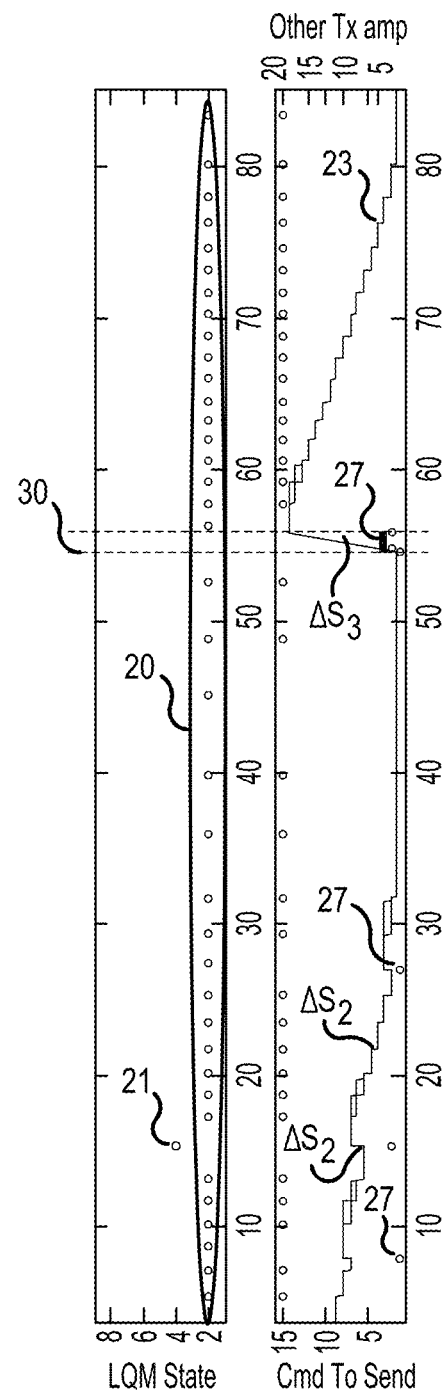
Fig. 3a  Fig. 3b          Fig. 4a  Fig. 4b

POWER MANAGEMENT IN LOW POWER WIRELESS LINK IN A HEARING AID SYSTEM

CROSS-REFERENCE TO RELATED APPLICATIONS

This application is a Continuation of copending application Ser. No. 17/509,971, filed Oct. 25, 2021, which is a Continuation of application Ser. No. 16/840,927, filed on Apr. 6, 2020 (now U.S. Pat. No. 11,197,108, issued on Dec. 7, 2021), which is a Continuation of application Ser. No. 16/124,073, filed on Sep. 6, 2018 (now U.S. Pat. No. 10,652,675, issued on May 12, 2020), which claims priority under 35 U.S.C. § 119(a) to application Ser. No. 17/189, 743.2, filed in Sep. 7, 2017 in Europe, all of which are hereby expressly incorporated by reference into the present application

TECHNICAL FIELD

The present invention relates to low power wireless communication, and especially to power controller, including power regulation. The invention relates specifically to a hearing aid system comprising a first hearing aid device and a mobile device, each comprising a transmit and receive units for establishing a short range wireless link between the devices.

BACKGROUND

First generation wireless link systems for portable listening devices, such as hearing aid devices and mobile devices, have typically been based on fixed transmitted power between the devices. The transmitter current is, e.g. in the production phase, (conservatively) aligned to the minimum current with which the system always can achieve internal communication, taking into account component tolerances, different operational distances between devices because of variation in head sizes placement of the mobile device relative to a hearing aid device, etc. The overhead in current in a particular setup represents a waste of power for those devices.

EP2211579 B1 describes a communication system comprising a first and a second portable communication device, each comprising transmit and receive units for establishing a wireless link between the devices, wherein at least the first communication device is a portable listening device and comprises a control unit for dynamically adjusting the transmit power of its transmit unit (TX) based on a measure (LQ) of the quality of the link provided by a link quality evaluation unit. The link quality evaluation unit of the receiving device is adapted to combine one or more link quality measures for determining an appropriate transmit power level for the transmitting device.

For example, the AGC settings are combined with a CRC-check, e.g. in such a way that only AGC settings for error-free frames are stored and used for the estimate of link quality, or the AGC settings are combined with a BER measure.

SUMMARY

An object of the present disclosure is to provide a hearing aid system including a power controller configured to control power consumption in a short range wireless link.

An object of the invention is achieved by a hearing aid system comprising a first hearing aid device and a mobile device, wherein each of the devices comprising a transmit unit and a receive unit for establishing a short range wireless link between the devices. At least one of the devices comprises; a microphone configured to receive an acoustical audio signal, a signal processing unit configured to process an audio signal based on the acoustical audio signal, a first link quality estimator, where the first link quality estimator may be configured to determine a phase error of an information packet transmitted from the other device and received by the receive unit and determine a link quality signal based on the phase error, and wherein the at least one of the devices may be configured to transmit the link quality signal to the other device, and the other device may be configured to determine the power level of the transmission of the information packet based on the link quality signal via a power controller comprised by the other device.

The at least one of the devices may comprise a power controller configured to adjust a power level of the transmission of the information packet based on a link quality signal transmitted by the other device comprising the first link quality estimator.

The power controller may adjust the power level of the transmission within a maximum power level and a minimum power level.

A further object of the invention is achieved by a hearing aid system comprising a first hearing aid device and a mobile device, wherein each of the devices comprising a transmit unit and a receive unit for establishing a short range wireless link between the devices, wherein at least one of the devices comprises; a power controller configured to determine a power level of a transmission of an information packet transmitted from the other device and received by the receive unit by transmitting the link quality signal via the transmit unit, a first link quality estimator, where the first link quality estimator is configured to determine a phase error of the information packet received by the receive unit and provide the link quality signal based on the phase error, and wherein the other device is configured to determine the power level of the transmission of the information packet based on the link quality signal.

This has the advantage of enabling an adaptation of the power consumption to the current needs. In an embodiment, a minimization of power consumption of the short range wireless link is enabled.

It is known to use an automatic gain controller or a signal strength controller for controlling the power of a short range wireless link in a communication system. By using gain controller and/or signal strength controller the distinguishing between whether the increase/decrease in gain or signal strength in the link is due to either the noise or the actual signal in the wireless link is not present The advantage of using phase error detection is that a change in the signal-to-noise ratio is detectable. Thereby, it is possible to distinguishing between whether the increase/decrease in gain or signal strength in the link is due to either the noise or the actual signal in the wireless link.

If the hearing aid system is in a noisy environment including for example a monitor screen acting as a noise source, and the mobile device transmits an information packet to the first hearing aid device via the short range wireless link, the noise emitted by the noise source will interfere with the signal including the information packet. The receiving unit, which in this example is the first hearing aid device, detects via the power controller an increase in the signal strength or in the gain of the transmission including the information packet, when the noise from the noise source interferes with the transmission. In known solutions, the transmitting unit, which in this example is the mobile device, will reduce the power level of the transmission of the information packet or increase the power if the power level of the interfere, i.e. the noise source, is high enough to dominate the receiver power, the noise is so high that it is breaking the link, however, in present disclosure, the transmitting unit will keep the power level of the transmission constant even though the noise starts to interfere with the signal (i.e. the power level of the transmission has not changed). The receiving unit transmits the link quality signal to the transmitting unit. The transmitting unit controls the power level of the transmission of the information packet based on the received link quality signal. In this specific example, the power level is increased due to the noise provided by the noise source.

The first link quality estimator determines the phase error based on phase error detection, phase offset detection, frequency error detection or based on a modulation scheme of the information packet.

The information packet may be a data packet and/or an audio packet transmitted by the mobile device or the first hearing aid device.

The first hearing aid device and the mobile device may comprise an antenna coil, and where the short range wireless link may be an inductive coupling between the first hearing aid device and the mobile device.

The mobile device may be a second hearing aid device or an auxiliary device, such as a smartphone or an intermediate streaming device.

The advantage of the mobile device being a second hearing aid device is that an adaptation of the power consumption to the current needs in a binaural communication between the first and second hearing aid device has improved.

The term 'a measure of the quality of the link' is in the present context also termed 'link quality' and abbreviated 'LQ'. It is understood that an increase in link quality means a better and more reliable link, whereas a decrease in link quality means a worse and less reliable link.

The power controller may further be configured to dynamically adjust the transmit power of the transmit unit for transmitting the information packet based on a measure of the quality of the link.

At least one of the devices in the hearing aid system has a local energy source, e.g. in the form of a battery. The devices may be a low power device comprising an energy source, which—without being exchanged or recharged—is of limited duration (the limited duration being e.g. of the order of hours or days, such duration being limited compared to the expected life time of the device). The maximum supply voltage of the energy source may be less than 5 V, such as less than 4 V, such as less than 3 V, such as less than 1.5 V. The typical duration of the energy source of the device is less than 2 weeks, such as less than 1 week, such as less than 2 days, such as less than 1 day, such as less than 8 hours.

In general, the wireless link can be of any type used under power constraints such as in a portable (typically battery driven) hearing aid device. In an embodiment, the wireless link is a link based on near-field communication, e.g. an inductive link based on an inductive coupling between antenna coils of the first hearing aid device and the mobile device. In another example, the wireless link is based on far-field, electromagnetic radiation. In a further example, the communication via the wireless link is arranged according to a specific modulation scheme, e.g. an analogue modulation scheme, such as FM (frequency modulation) or AM (amplitude modulation), or a digital modulation scheme, such as FSK (frequency shift keying), PSK (phase shift keying) or FH-SS (frequency hopping spread spectrum).

The measure of the quality of the link is extracted in the receiving communication device, for example in the first hearing aid device, based on the signal, including the information packet, received from the transmitting communication device.

The power controller may be configured to determine the power level of the transmission of the information packet according to a first threshold and a second threshold.

The link quality signal may comprise estimates of the phase error, where the estimate of the phase error may be determined by averaging the phase error of the multiple samples/bits of the information packet, and furthermore, the average phase error per information packet is further averaged in between several information packets with, for example, a low pass filter. The average in between the several information packets is denoted as a link quality phase metric. The link quality signal comprises the link quality phase metric which expresses the average phase error of several information packets.

If the link quality phase metric is below the first threshold then the power controller is configured to decrease the power level of the transmission of the information packet, and/or if the link quality phase metric is above the second threshold then the power controller is configured to increase the power level of the transmission of the information packet. Additionally, if the link quality phase metric is between the two thresholds then the power controller is configured to keep the power level constant.

Small variations of the phase error may not affect the audible signal in the information packet in such a way that the user is able to hear it. However, the variations in the phase error may cause unnecessary variations in the power level of the transmission of the information packet, since the first link quality estimator is configured to transmit the link quality signal independent of the level of the phase error, i.e. the level of link quality phase metric. Then, by applying the teaching of that the link quality phase metric has to be between the first threshold and the second threshold will prevent the transmitting device, for example the first hearing aid device or the mobile device, to perform unnecessary power adjustment of the power level of the transmission of the information packet.

The power controller may further be configured to increase the power level with a first power step size based on the link quality signal if the link quality phase metric is above the second threshold, and/or the power controller may be configured to decrease the power level with a second power step size based on the link quality signal if the link quality phase metric is below the first threshold, and where the first threshold is smaller than the second threshold.

So, the value of the first threshold is less than the second threshold.

The first power step size may be larger or smaller than the second power step size, or the first power step size may be equal to the second power step.

The first and the second power step size increases or decreases based on a ratio between the amount of the link quality phase metric and a time period.

In an example, only control signals, e.g. concerning settings of an individual device defining its current state or the link quality signal, are transmitted via the wireless link. In another example, full or partial audio signals (e.g. certain frequency ranges of the audio signal), possibly including control signals, are transmitted via the wireless link.

The measure of the quality of the link may be extracted in a link quality evaluation unit in the receiving communication device, for example the mobile device, based on the signal received from the transmitting communication device, for example the first hearing aid device.

The hearing aid system may be adapted to transmit and receive signals according to a digital protocol, wherein the transmitted and received signals may comprise data arranged in packets according to said protocol.

In an embodiment, the receiving communication device may be adapted to transmit the measure of the quality of the link to the transmitting communication device, e.g. the first hearing aid device or the mobile device, and the transmitting communication device may be adapted to receive the measure of the quality of the link and to adjust the transmit power based on the received measure of the quality of the link.

The actions of regulating the power level of the transmitter of the transmitting device may be performed after a delay corresponding to the action in question, the delay possibly depending on the current power level, and/or the intended future power level, and/or a value and/or a rate of change of the link quality measure, a fast rate of change and/or a relatively large intended change in power level (e.g. more than one power level step) e.g. resulting in a low or no delay in the consequent regulation.

In an embodiment, the link quality measure may be averaged over time. By adjusting the time over which the link quality may be averaged, the speed of reaction of the power level adjustment can be influenced, an increased averaging time resulting in a reduced speed of reaction and vice versa.

The first hearing aid device and/or the mobile device and/or a server connected to the mobile device or the first hearing aid device may comprise a memory for storing the link quality signal and/or position of a user wearing the hearing aid device and/or the mobile device.

The at least one of the devices, the first hearing aid device and/or the mobile device, may be configured to determine the link quality signal based on the position of the user wearing the hearing aid device and/or the mobile device. In this example, the mobile device may communicate with a server with the position of the user of the first hearing aid device. The first hearing aid device, the mobile device or the server may comprise a memory unit. The first hearing aid device may be connected either directly or indirectly via the mobile device to the server. The memory unit may comprise a noise map which defines locations of noise sources and noise fields of the noise sources. The mobile device or the first hearing aid device may receive status information from the server of the noise sources based on the position of the user. The status information includes for example whether the noise source is turned on or off, i.e. whether the noise source emits noise or not. The mobile device, the first hearing aid device or the server may include the first link quality estimator for determining the link quality signal based on the position of the user and the noise sources and the noise fields of the respective noise sources.

By detecting the position of the user has the advantage of that the hearing aid system is able to predict when phase error in the transmission may occur due to external noise sources. Thereby, the power controller of the transmitting device, for example the mobile device, may increase the power of the transmission before an actual phase error starts to occur.

The at least one of the devices, the first hearing aid device and/or the mobile device, may comprise a second link quality estimator, where the second link quality estimator may be configured to determine whether one or more information packets are lost and/or to determine a number of bit errors, and the second link quality estimator may be configured to determine the link quality signal based on the determined number of lost information packets and/or the determined number of bit errors.

The at least one of the devices, for example the first hearing aid device, may comprise the power controller configured to adjust the power level of the transmission of the information packet based on the link quality signal transmitted by the other device comprising the second link quality estimator or based on the link quality signal transmitted by the second link quality estimator of the device comprising the power controller.

Detecting phase error reduces the risk of getting phase error and/or missing packets in the transmission between the first hearing aid device and the mobile device, and by combining the two quality estimators a suddenly phase error and/or a missing packet can still be detected and rectified by the power controller of the transmitting device.

The hearing aid system may combine multiple link quality measures for determining an appropriate transmit power level of the transmitting device, i.e. the device transmitting the information packet. The combination of the first link quality estimator and the second link quality estimator, i.e. the combination of for example phase error detection and BER detection, are used separately for determining an appropriate transmit power level for the transmitting.

The first link quality estimator and the second link quality estimator are both configured to determine continuously the link quality signal. The link quality signal may comprise the information about number of lost information packets and/or the determined number of bit errors and/or the determined phase error.

The at least one of the devices may be configured to determine continuously the link quality signal based on the determined number of lost information packets and/or the determined number of bit errors and/or the determined phase error.

The first link quality estimator and the second link quality estimator are both configured to determine continuously the link quality signal in parallel or sequentially.

In a preferred example, the first link quality estimator and the second link quality estimator are both running simultaneously.

The power controller may be configured to adjust the power of the transmission of the information packet according to a power step size. The power controller may be configured to increase the power level with a first power step size if the link quality phase metric is above the second threshold, and/or the power controller may be configured to decrease the power level with a second power step size if the link quality phase metric is below the first threshold, and where the first threshold is smaller than the second threshold.

The power controller may further be configured to increase the power level of the transmission of the information packet with a third power step size based on the link quality signal based on the link quality signal and the second link quality estimator. The third power step size increases or decreases based on a ratio between the number of lost information packets and a time period or a ratio between the number of bit errors and the time period.

If for example the time period between each bit error decreases or frequency increased, then the third power step size has to be increased in order to obtain a faster response to the escalation of the number of bit errors occurring in the transmission of the information packet.

The power controller may be configured to increase or decrease the first step size and the second step size if the phase errors starts to increase more rapidly. So in order to obtain a faster response to the rapidly growing of phase error then the first/second step size has to be increased.

A further object of the invention is achieved by a method for determine the power level of a transmission of an information packet between a first hearing aid device and a mobile device, wherein the method comprising;
    transmitting an information packet via a transmit unit to at least one of the devices from the other device
    receiving the information packet via a receive unit of the at least one of the devices,
    detecting a phase error of the information packet received by the receive unit,
    determining a link quality signal based on the phase error,
    transmitting the link quality signal to the other device,
    determining a power level of the transmission of the information packet based on the link quality signal in the other device.

The first link quality estimator and/or the second link quality estimator may be configured to evaluate the link quality and provide the link quality signal according to a predefined scheme, e.g. at regular intervals in time, e.g. ≥ every 100 s, such as ≥ every 10 s or such as ≥ every 1 s. Alternatively, the time instances of evaluating the link quality may be dynamically determined, e.g. dependent upon the current and/or an intended future transmission power level or based on recorded link qualities or power levels for a preceding time interval, such as the last hour or the last 10 minutes or the last minute or the last 10 s or the last 1 s or less. The time between evaluations of link quality and possible regulation of the transmission power level may decreases when transmission power level increases.

The link quality may be continuously monitored. The transmission power level may continuously be regulated. The transmission power level is regulated (if changes are necessary) according to a predefined scheme, e.g. with a delay of 1 s or 5 s or 10 s or 20 s or dependent upon the current link quality or the rate of change of link quality (a large rate of change of link quality inducing a rapid change of transmission power level).

The power controller is configured to raise its own transmitter power, when several packets are lost. If the first hearing aid device has lost several packets from the other device in a row, most likely the other side is not able to receive the link quality signal from the first hearing aid device, and therefore the power controller of the first hearing aid device is configured to increase the power of the transmission of the link quality signal.

BRIEF DESCRIPTION OF DRAWINGS

The aspects of the disclosure may be best understood from the following detailed description taken in conjunction with the accompanying figures. The figures are schematic and simplified for clarity, and they just show details to improve the understanding of the claims, while other details are left out. Throughout, the same reference numerals are used for identical or corresponding parts. The individual features of each aspect may each be combined with any or all features of the other aspects. These and other aspects, features and/or technical effect will be apparent from and elucidated with reference to the illustrations described hereinafter in which:
FIGS. 3*a* and 3*b*, illustrate measurements of a hearing aid system,
FIGS. 4*a* and 4*b*, illustrate measurements of a hearing aid system including a second link quality estimator.

DETAILED DESCRIPTION

Figure 1:
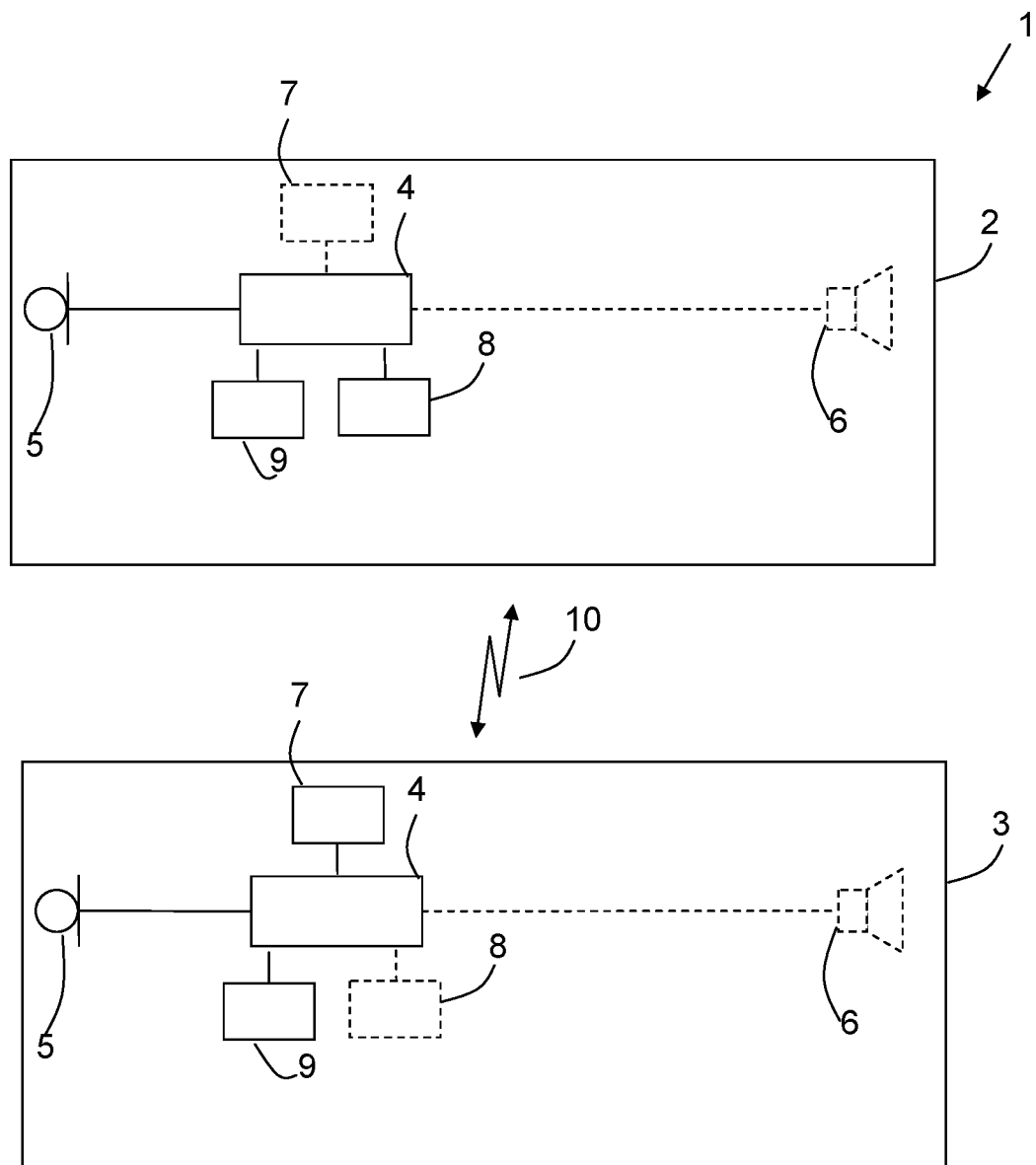
FIG. 1, illustrates a hearing aid system.

The detailed description set forth below in connection with the appended drawings is intended as a description of various configurations. The detailed description includes specific details for the purpose of providing a thorough understanding of various concepts. However, it will be apparent to those skilled in the art that these concepts may be practiced without these specific details. Several aspects of the apparatus and methods are described by various blocks, functional units, modules, components, circuits, steps, processes, algorithms, etc. (collectively referred to as "elements"). Depending upon particular application, design constraints or other reasons, these elements may be implemented using electronic hardware, computer program, or any combination thereof.

A hearing aid device may include a hearing aid that is adapted to improve or augment the hearing capability of a user by receiving an acoustic signal from a user's surroundings, generating a corresponding audio signal, possibly modifying the audio signal and providing the possibly modified audio signal as an audible signal to at least one of the user's ears.

The hearing aid device is adapted to be worn in any known way. This may include i) arranging a unit of the hearing aid device behind the ear with a tube leading air-borne acoustic signals or with a receiver/loudspeaker arranged close to or in the ear canal such as in a Behind-the-Ear type hearing aid or a Receiver-in-the Ear type hearing aid, and/or ii) arranging the hearing device entirely or partly in the pinna and/or in the ear canal of the user such as in an In-the-Ear type hearing aid or In-the-Canal/Completely-in-Canal type hearing aid, or iii) arranging a unit of the hearing device attached to a fixture implanted into the skull bone such as in Bone Anchored Hearing Aid or Cochlear Implant, or iv) arranging a unit of the hearing device as an entirely or partly implanted unit such as in Bone Anchored Hearing Aid or Cochlear Implant.

A hearing aid device may be part of a "hearing aid system", which refers to a system comprising one or two hearing devices, disclosed in present description, and a "binaural hearing system" refers to a system comprising two hearing devices where the devices are adapted to cooperatively provide audible signals to both of the user's ears. The hearing aid system or binaural hearing system may further include mobile device(s) that communicates with at least one hearing aid device, the mobile device affecting the operation of the hearing aid devices and/or benefitting from the functioning of the hearing aid devices. A wired or wireless communication link between the at least one hearing aid device and the mobile device is established that allows for exchanging information (e.g. control and status signals, possibly audio signals) between the at least one hearing aid device and the mobile device. Such mobile devices may include at least one of remote controls, remote microphones, audio gateway devices, mobile phones, public-address systems, car audio systems or music players or a combination thereof. The audio gateway is adapted to receive a multitude of audio signals such as from an entertainment device like a TV or a music player, a telephone apparatus like a mobile telephone or a computer, a PC. The audio gateway is further adapted to select and/or combine an appropriate one of the received audio signals (or combination of signals) for transmission to the at least one hearing aid device. The remote control is adapted to control functionality and operation of the at least one hearing aid devices. The function of the remote control may be implemented in a Smartphone or other electronic device, the Smartphone/electronic device possibly running an application that controls functionality of the at least one hearing aid device.

In general, a hearing aid device includes i) an input unit such as a microphone for receiving an acoustic signal from a user's surroundings and providing a corresponding input audio signal, and/or ii) a receiving unit for electronically receiving an input audio signal. The hearing aid device further includes a signal processing unit for processing the input audio signal and an output unit for providing an audible signal to the user in dependence on the processed audio signal.

The input unit may include multiple input microphones, e.g. for providing direction-dependent audio signal processing. Such directional microphone system is adapted to enhance a target acoustic source among a multitude of acoustic sources in the user's environment. In one aspect, the directional system is adapted to detect (such as adaptively detect) from which direction a particular part of the microphone signal originates. This may be achieved by using conventionally known methods. The signal processing unit may include amplifier that is adapted to apply a frequency dependent gain to the input audio signal. The signal processing unit may further be adapted to provide other relevant functionality such as compression, noise reduction, etc. The output unit may include an output transducer such as a loudspeaker/receiver for providing an air-borne acoustic signal transcutaneously or percutaneously to the skull bone or a vibrator for providing a structure-borne or liquid-borne acoustic signal. In some hearing aid devices, the output unit may include one or more output electrodes for providing the electric signals such as in a Cochlear Implant.

It should be appreciated that reference throughout this specification to "one embodiment" or "an embodiment" or "an aspect" or features included as "may" means that a particular feature, structure or characteristic described in connection with the embodiment is included in at least one embodiment of the disclosure. Furthermore, the particular features, structures or characteristics may be combined as suitable in one or more embodiments of the disclosure. The previous description is provided to enable any person skilled in the art to practice the various aspects described herein. Various modifications to these aspects will be readily apparent to those skilled in the art, and the generic principles defined herein may be applied to other aspects.

The claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more.

Accordingly, the scope should be judged in terms of the claims that follow.

FIG. 1 illustrates the hearing aid system 1. The hearing aid system 1 comprising a first hearing aid device 2 and a mobile device 3, wherein each of the devices (2, 3) comprising a transmit unit 9 and a receive unit 9 for establishing a short range wireless link 10 between the devices (2,3). At least one of the devices 2 comprises; a microphone 5 configured to receive an acoustical audio signal, a signal processing unit 4 configured to process an audio signal based on the acoustical audio signal, a first link quality estimator 8, where the first link quality estimator 8 may be configured to determine a phase error of an information packet transmitted from the other device 3 and received by the receive unit 9 and determine a link quality signal based on the phase error, and wherein the at least one of the devices 2 may be configured to transmit the link quality signal to the other device 3, and the other device 3 may be configured to determine the power level of the transmission of the information packet based on the link quality signal via a power controller 7 comprised by the other device 3.

In this specific example, the first hearing aid 2 may optionally comprise a power controller 7 configured to adjust a power level of the transmission of the information packet based on a link quality signal transmitted by the other device 3 comprising an optionally first link quality estimator 8.

It is optionally whether the devices comprise a speaker 6.

Figure 2:
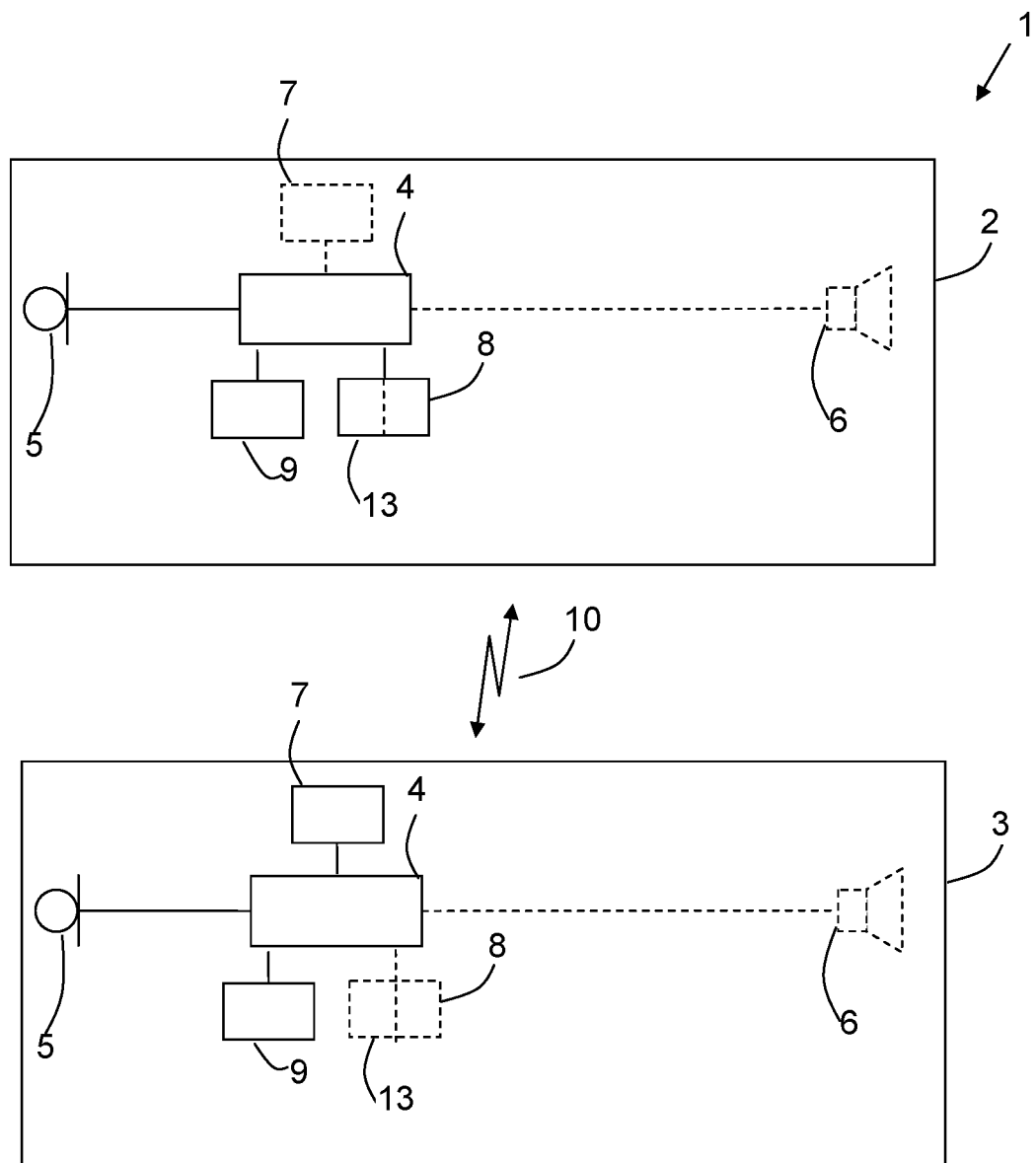
FIG. 2, illustrates a hearing aid system including a second link quality estimator.

FIG. 2 illustrates the hearing aid system including a second link quality estimator 13. The at least one of the devices (2, 3), the first hearing aid device 2 and/or the mobile device 3, may comprise a second link quality estimator 13, where the second link quality estimator 13 is configured to determine whether one or more information packets are lost and/or to determine a number of bit errors. The second link quality estimator is configured to determine the link quality signal based on the determined number of lost information packets and/or the determined number of bit errors.

The second link quality estimator 13 may comprise Bit-Error detection and/or detection of lost information packets, CRC error detection or packet loss.

In this specific example, the first hearing aid device 2 comprises the second link quality estimator 13. The first hearing aid device 2 is then configured to determine continuously the link quality signal based on a determined number of lost information packets and/or the number of bit errors via the second link quality estimator 13, and via the first link quality estimator 8, the first hearing aid device 2 is configured to determine continuously the link quality signal based a determined phase error.

FIGS. 3a and 3b show measurements of the hearing aid system 1 which illustrates the functionality of the first link quality estimator 8 together with the power controller 7.

The measurements are provided on the transmission of the information packet comprising multiple samples, and the link quality estimator 8 is configured to estimate the phase error of each received sample/bit and averages the phase error over the whole information packet. The averaged phase error of each received sample is denoted as the link quality phase metric. In 20, the link quality phase metric is less than the first threshold th1, and in 21, the link quality phase metric is being larger than the second threshold th2.

The power controller is adjusting the power level 23 of the transmission according to the link quality phase metric estimated by the first link quality estimator 8. In 24, the power controller 7 decreases the power level 23 since the link quality phase metric is below the first threshold th1. The power controller 7 is configured to not decrease the power level 23 below a predefined minimum. The power controller 7 may decrease the power level 23 with the second power step size $\Delta s_2$.

In 25, the power controller 7 of the transmitting device (2 or 3) increases the power level 23 of the transmission, since the link quality phase metric is above the second threshold th2, i.e. the amount of phase error is critical with respect to destroying for example the audio in the information packet. The power controller 7 increases the power level 23 with the first power step size $\Delta s_1$. In this specific example, the first power step size is larger than the second power step size due to a CRC error The power controller 7 is configured not to increase the power level 23 above a predefined maximum.

FIGS. 4a and 4b show measurements of the hearing aid system 1 which illustrates the functionality of the second link quality estimator 13 together with the power controller 7.

In 20, the link quality phase metric is less than the first threshold th1, and in 21, the link quality phase metric is being larger than the second threshold th2. It is seen that the power controller 7 reduces the power level in corresponds to the link quality phase metric being less than the first threshold th1, and the power controller 7 increases the power level due to the link quality phase metric being larger than the second threshold. In 27, the transmission experiences either bit error or missing information packets, and the respond of the power controller 7 is to increase the power level 23 with a third power step size $\Delta s_3$ which is larger than the second power step size $\Delta s_2$ being used for decreasing the power level 23.

In 27, multiple of missing information packets or bit errors have occurred, and the power control 7 increases the power level 23 of the transmission significantly and within a short time period. The missing of information packets stops and the power controller 7 decreases the power level 23 to a minimum power level.

Figure 5:
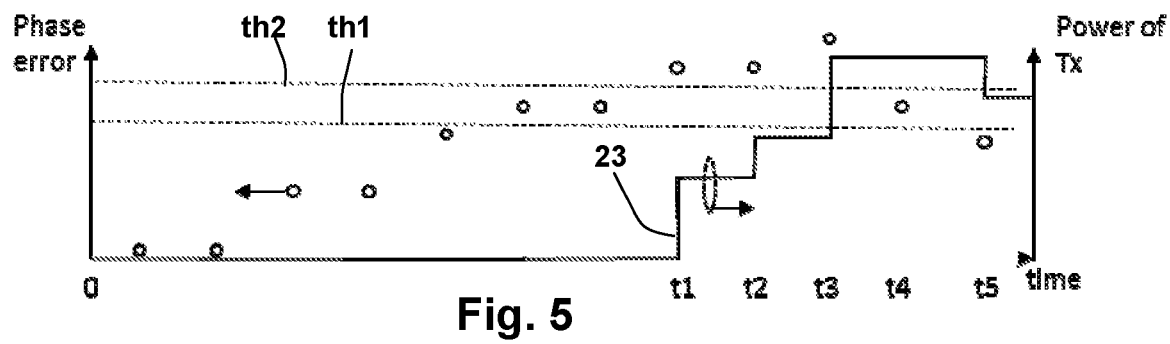
FIG. 5, illustrates a first threshold and a second threshold.

FIG. 5 illustrates the first threshold th1 and the second threshold and how the power controller 7 is varying the power level 23 of the transmission in respect to whether the link quality phase metric is between the two thresholds (th1, th2) or below and above the first threshold and the second threshold, respectively. Between time 0 and t1 a variation in the link quality phase metric is seen. The power controller does not change the power level between 0 and t1 since the power of the transmission is already at the minimum level. At time t1 it is seen that the power controller increased the power since the link quality phase metric has increased above the second threshold th2. At time t2 the power controller 7 increases the power even more since the first increase in power at time t1 did not reduce the amount of the link quality phase metric. At time t3 the power controller 7 increases the power of the transmission once again, and at time t4, the link quality phase metric is now between the two thresholds (th1, th2), and the power controller 7 keeps the power of the transmission constant. At time t5 the link quality phase metric has dropped below the first threshold th1, and the power controller reduces the power in the transmission.

Figure 6:
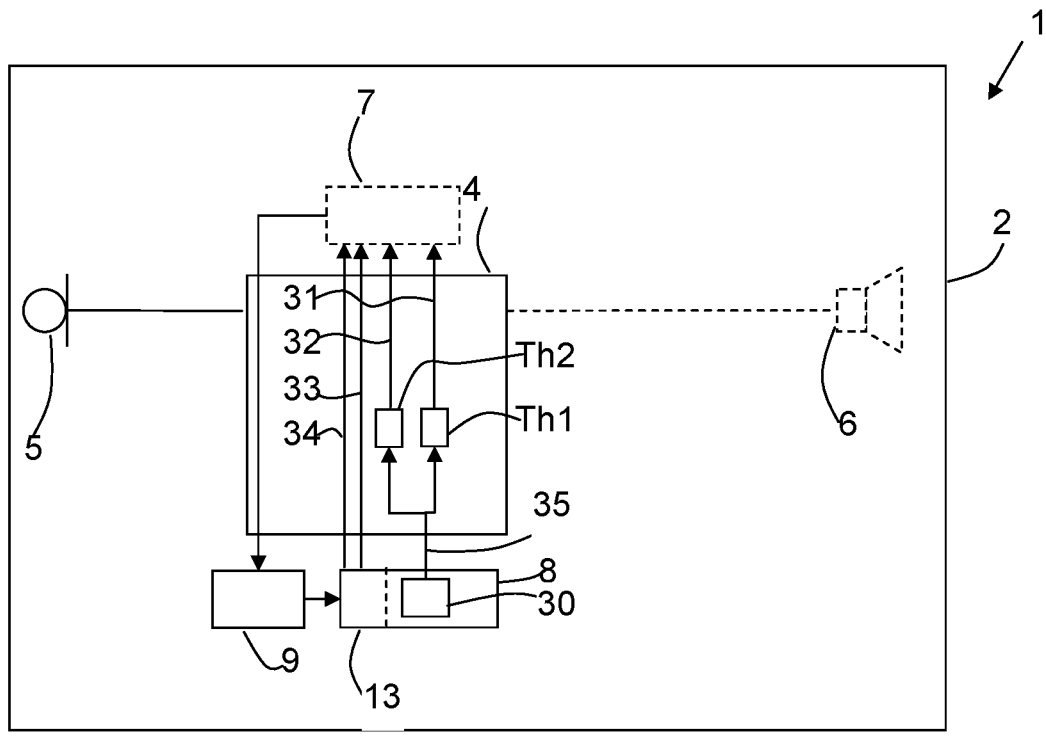
FIG. 6, illustrates a hearing aid system.

FIG. 6 illustrates the hearing aid system 1, where in this example at least one of the device (2, 3), i.e. the first hearing aid device 2 and/or the mobile device 3, comprises the first link quality estimator 8 and/or the second link quality estimator 13. In this specific example both estimators receive the received information packets from the receiving unit 9. The first link quality estimator 8 estimates the phase error of each received sample/bit of the information packet, and averages the estimated phase error for each sample/bit over the whole packet. Then, the average phase error per information packet is further averaged in between several information packets with a low pass filter 30. This further averaged phase error is denoted as the link quality phase metric 35. The link quality phase metric 35 is then checked against the two thresholds (th1, th2). If the metric 35 is under first threshold th1, the link quality is unnecessary too high, and therefore, the power controller will transmit the link quality signal (31, 9) to the mobile device 3, and the power controller 7 of the mobile device is then configured to lower its power 23 of the transmission. If the metric is over the second threshold th2, the link quality is too low, and therefore, the power controller will command (32,9) the mobile device 3 to raise its power by transmitting the link quality signal. The first hearing aid device 2 may also be configured to command itself in order to increase the power of the transmit unit 9 in the first hearing aid device 2 with the purpose that the other device 3 can receive the link quality signal.

The thresholds may dynamically change according to a desired bit error rate range of the transmission between the two devices. The desired bit error rate range may be between $10^{-5}$ and $10^{-7}$. Alternatively, the thresholds may be predetermined according to the desired bit error rate range.

The power controller 7 of the first hearing aid device 3 or the mobile device 3 may further be informed about CRC 33 errors or packet loss 34 via the second link quality estimator 13. The power controller 7 will then request the other device 3 to raise its transmission power 23. If the first hearing aid device 2 is not able to communicate to the other device 3, then the power controller 7 of the device 2 is configured to raise the power of the transmit unit 9 of the first hearing aid device 2 if the first hearing aid device does not experience any effect of the link quality of the transmission when transmitting one or more link quality signals.

The mobile device 3 may be the transmitting or receiving device of the information packets and the features of the first hearing aid device may be the transmitting or receiving device of the information packets.

Figure 7:
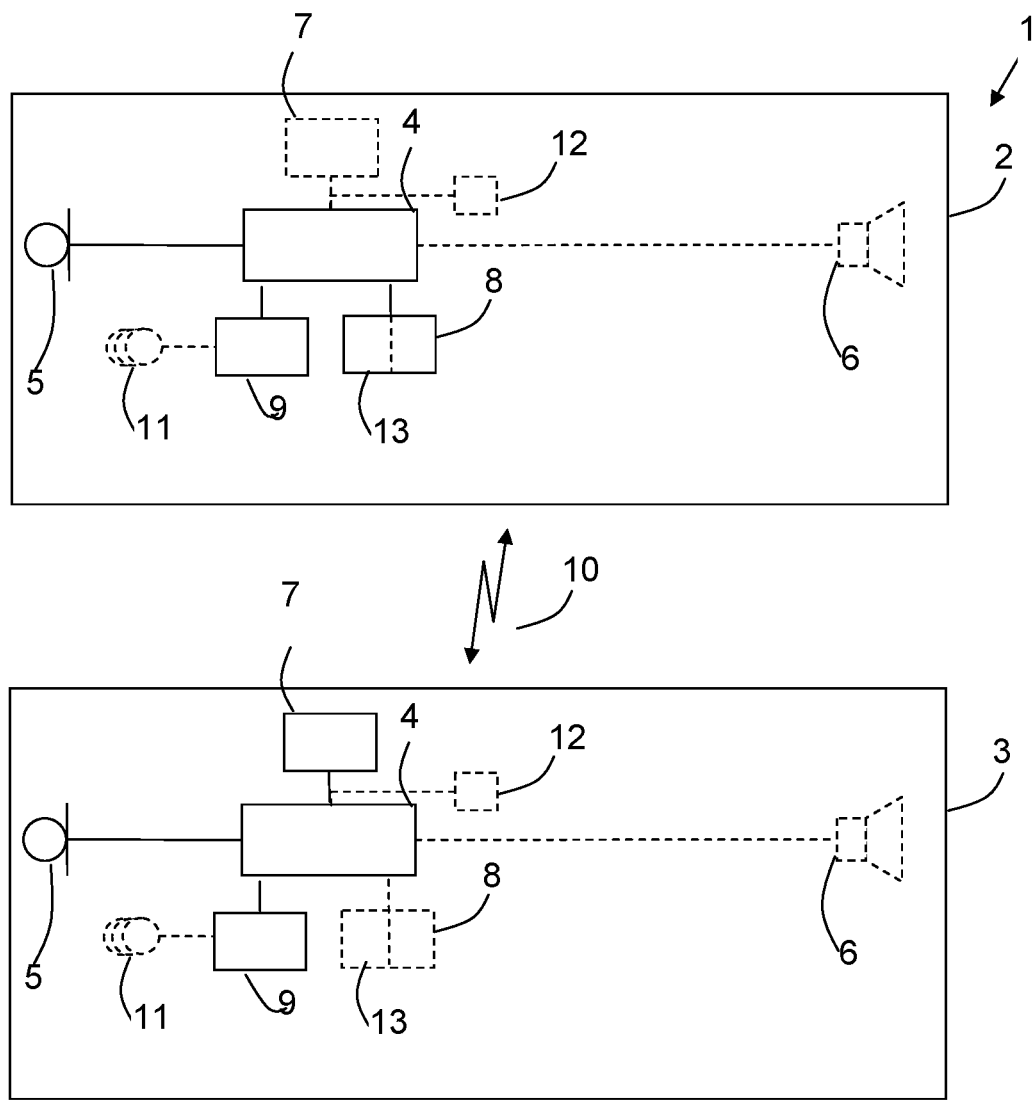
FIG. 7, illustrates a hearing aid system.

FIG. 7 illustrates that at least one of the devices (2, 3) of the hearing aid system 1 may comprise a memory 12 for storing the link quality signal and/or position of a user wearing the hearing aid device and/or the mobile device. The hearing aid system 1 may comprise a server which may be connected to the mobile device or the first hearing aid device via a wireless link. The server may comprise the memory 12. Additionally, at least one of the devices may comprise an antenna coil 11 configured to receive and/or transmit wirelessly. The antenna coil 11 may be configured to short and/or long range communication via a wireless link.

Figure 8:
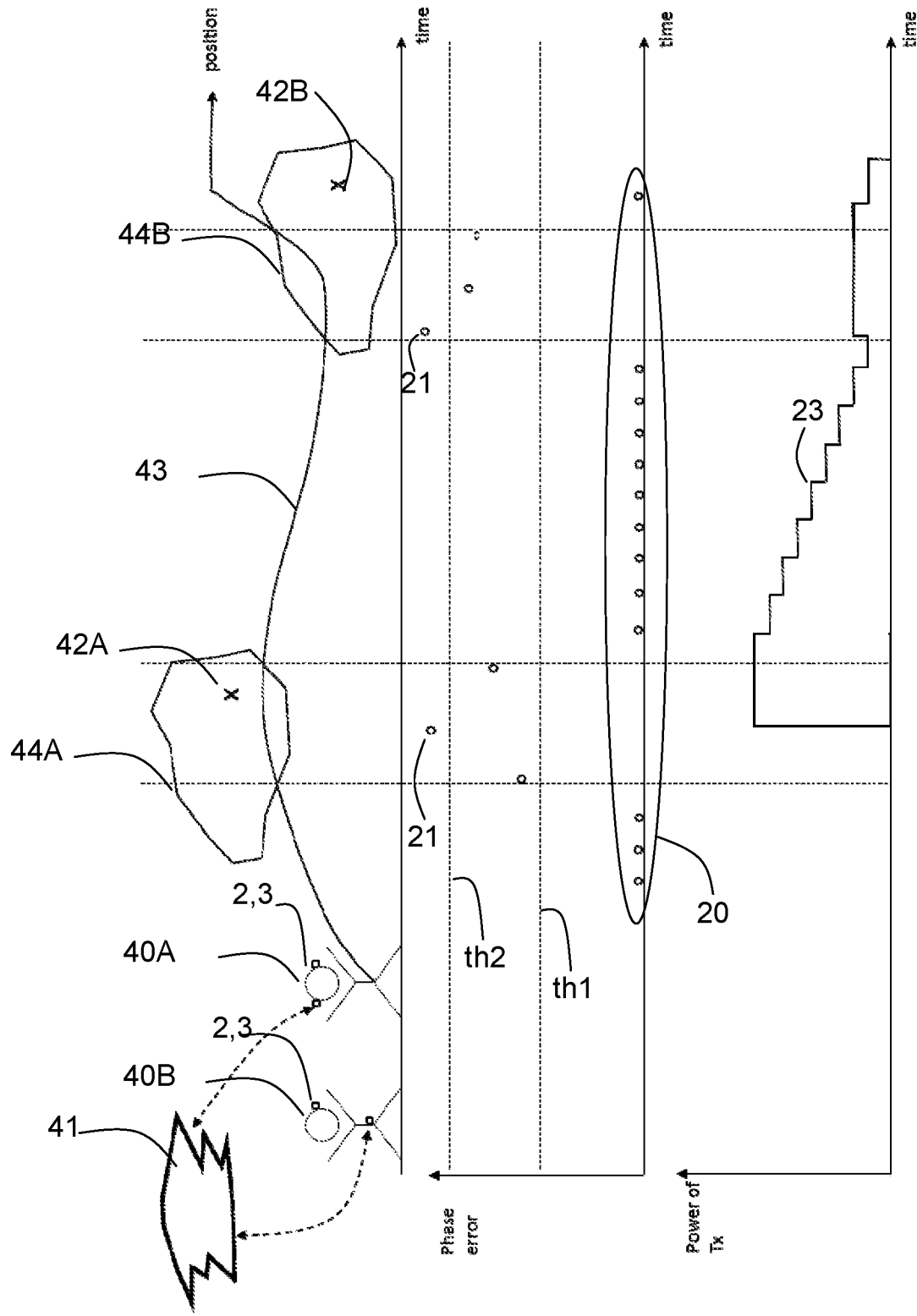
FIG. 8, illustrate an example of a hearing aid system.

FIG. 8 illustrates an example where at least one of the devices, the first hearing aid device 2 and/or the mobile device 3, is configured to determine the link quality signal based on the position of the user (40A,40B) wearing the hearing aid device 2 and/or the mobile device 3. In this example, one of the users 40A is wearing the hearing aid system 1 where the mobile 3 is a second hearing aid device 3 configured to communicate with a server 41, and the other user 40B is wearing another hearing aid system 1 where the mobile device 3 is a smartphone 3 configured to communicate with the server 41. Both hearing aid systems 1 of the two users (40A, 40B) communicate with a server with the position 43 of the respective users (40A, 40B). The first hearing aid device 2, the mobile device 3 and/or the server 41 may comprise a memory unit 12. The memory unit 12 may comprise a noise map which defines locations of noise sources (42A, 42B) and respective noise fields (44A, 44B). Both hearing aid systems receives the status information from the server 41 of the noise sources based on the position 43 of the respective users (40A, 40B). The status information includes for example whether the noise sources (42A, 42B) are turned on or off, i.e. whether the noise sources (42A, 42B) emit noise or not. The first respective link quality estimators of the respective hearing aid systems determine the link quality signal based on the position of the respective users (40A, 40B) relative to the noise sources (42A, 42B) and the respective noise fields (44A, 44B).

In this specific example, one of the users 40A walks through the noise field 44A of one of the noise sources 42A, and it is clearly seen that the phase error 21, expressed as the link quality phase metric, of the transmission of the information packets increases above the second threshold th2. Then the power controller 7 of the hearing aid system 1 of the user 40A increases the power 23 of the transmission in order to improve the link quality of the wireless link between the two devices (2,3) of the hearing aid system 1. Then due to the increase of the power 23, the phase error in the transmission of the information packets decreases to a level being between the first threshold th1 and the second threshold th2. The power controller 7 does not change the power 23. The phase error 20 decreases to below the first threshold th1, and then the power controller 7 starts to decrease the power 23 with a certain power step size, i.e. a first power step size or a second power step size, in order to reduce the power consumption of the hearing aid system, and thereby, in order to obtain a long lifetime of the battery within the first hearing aid device 2 and the second hearing aid device 3.

The user continues with his/hers walking, and while the user 40A is walking towards the other noise source 42B, the power controller 7 reduces the power 23 even more until the user 40A reaches the noise field 44B of the other noise source 42B. The power controller 7 immediately compensate for the poor link quality by increasing the power 23. The power 23 is again reduced when the user 40A is outside the noise field 44B of the other noise source 42B.

The invention claimed is:

1. A hearing aid device configured to wirelessly communicate with a mobile device, wherein the hearing aid device comprises a transmit and receive unit for establishing a short-range wireless link between the hearing aid device and the mobile device, wherein the hearing aid device comprises:
   a microphone configured to receive an acoustical audio signal,
   a signal processor configured to process an audio signal based on the acoustical audio signal, and
   at least one of
      link quality determining circuitry configured to determine a link quality signal based on a position of the user wearing the hearing aid device;
      a power controller configured to adjust a power level of transmission of an information packet between the hearing aid device and the mobile device based on a link quality signal determined by the mobile device and transmitted to the hearing aid device,
   wherein a memory unit is included in at least one of the first hearing aid device, the mobile device, and a server connected to the hearing aid device or the mobile device,
   wherein the memory unit stores a noise map correlating the position of the user wearing the hearing aid device with respective noise sources in the vicinity, and
   wherein the link quality signal is determined based on the noise source(s) determined to be in the vicinity of the user, according to the memory unit, based on the position of the user.

2. The hearing aid device according to claim 1, comprising the link quality determining circuitry.

3. The hearing aid device according to claim 2, further comprising the memory unit, wherein the link quality determining circuitry determines the link quality signal based on the contents of the memory unit.

4. The hearing aid device according to claim 2, wherein link quality determining circuitry further determines the link quality signal based on a phase error that is determined in accordance with at least one of phase error detection, phase offset detection, frequency error detection, and a modulation scheme of the information packet.

5. The hearing aid device according to claim 4, wherein the link quality circuitry determines the phase error by averaging the phase error of the multiple samples/bits of the information packet, and the average phase error per information packet is further averaged in between several information packets.

6. The hearing aid device according to claim 2, wherein the link quality circuitry further determines the link quality signal based on a determined number of lost information packets and/or a determined number of bit errors.

7. The hearing aid device according to claim 6, wherein the link quality circuitry is configured to determine continuously the link quality signal based on the determined number of lost information packets and/or the determined number of bit errors and/or a determined phase error.

8. The hearing aid device according to claim 1, comprising the power controller.

9. The hearing aid device according to claim 8, further comprising:
   a receiver to receive the link quality signal from the mobile device; and
   a transmitter to transmit the information packet to the mobile device according to the power level of transmission adjusted by the power controller.

10. The hearing aid device according to claim 8, wherein the information packet is a data packet and/or an audio packet transmitted by the mobile device or the hearing aid device.

11. The hearing aid device according to claim 1, wherein the hearing aid device comprises an antenna coil, and the information packet is transmitted between the hearing aid device and the mobile device via an inductive coupling configured as a short range wireless link.

12. The hearing aid device according to claim 1, wherein the information packet is a data packet and/or an audio packet transmitted by the mobile device or the first hearing aid device.

13. The hearing aid device according to claim 1, wherein the mobile device comprises at least one of a second hearing aid device, a smartphone, and an intermediate streaming device.

14. A hearing aid system comprising the hearing aid device and the mobile device of claim 1, wherein each of the hearing aid device and the mobile device comprises a transmit and receive unit for establishing a short range wireless link between the hearing aid device and the mobile device.

* * * * *